United States Patent [19] | [11] 4,207,626
Wedding et al. | [45] Jun. 10, 1980

[54] ACOUSTIC DECOY AND JAMMER

[75] Inventors: Leon E. Wedding, Washington, D.C.; William H. Gilbert, Hyattsville, Md.

[73] Assignee: The United States of America as represented by the Secretary of the Navy, Washington, D.C.

[21] Appl. No.: 435,098

[22] Filed: Jun. 7, 1954

[51] Int. Cl.[2] .............................................. H04B 11/00
[52] U.S. Cl. ...................................... 367/142; 116/27; 367/173
[58] Field of Search ....................... 102/7; 116/26, 27; 340/8 R, 12 R; 181/110

[56] References Cited

U.S. PATENT DOCUMENTS

| | | | |
|---|---|---|---|
| 1,194,726 | 8/1916 | Dunlop | 102/7 |
| 1,292,755 | 1/1919 | Guaghty | 340/2 |
| 1,310,586 | 7/1919 | Straub et al. | 102/7 |
| 1,326,156 | 12/1919 | Elia | 102/7 |
| 2,334,211 | 11/1943 | Miller | 102/7 |
| 2,346,325 | 4/1944 | Oliver | 117/26 |
| 2,438,438 | 3/1948 | Hammond . | |
| 3,548,905 | 4/1951 | Odenweller et al. | 116/27 |

FOREIGN PATENT DOCUMENTS

| | | | |
|---|---|---|---|
| 24821 | of 1914 | United Kingdom | 102/14 |

*Primary Examiner*—Harold Tudor
*Attorney, Agent, or Firm*—R. S. Sciascia; Q. E. Hodges

EXEMPLARY CLAIM

1. In an expendable acoustic apparatus adapted to operate underwater as a decoy and having an electrically driven noisemaker operative to generate sound waves of large amplitude over a broad band of frequencies, said noisemaker comprising a driving electrical drive means, a sea battery, energizing means for said drive means connecting said drive means and said battery, said energizing means including a time delay means for delayed energization of said drive means, said time delay means comprising a manually adjustable contact arm having an electrical contact thereon, a second contact arm having a second electrical contact, a driven gear train connected to said second contact arm and operative to rotate said second contact into engagement with said first contact, a latching means releasably holding said gear train from operation, said latching means including a latch biased out of engagement with said gear train and a fuse wire, said fuse wire being secured to said latch to maintain said latch in engagement with said gear train in a manner such that melting of the fuse wire disengages the latch to release the gear train for closing said contacts, and connections from said sea battery to said fuse wire.

7 Claims, 4 Drawing Figures

ACOUSTIC DECOY AND JAMMER

The invention described herein may be manufactured and used by or for the Government of the United States of America for governmental purposes without the payment of any royalities thereon or therefor.

The present invention relates to a buoyant acoustic system and more particularly to a self contained, expendable underwater noisemaker which is adapted to operate as a decoy.

Modern high speed vessles inherently produce various types of noises. These noises cover a wide range of frequencies and are transmitted through the water for long distances. Hydrophone detection of ships and submarines, through such noises, has long been employed by the navies of the world, while homing acoustic torpedoes and mines employed by the navies during the last war, following such noises, sank steadily increasing numbers of ships. Because it is generally difficult if not impossible or impractical to greatly reduce the noise radiated by a vessel, other means must be found to confuse an enemy and his homing weapons. One method of accomplishing this deception is to employ remotely positioned and independently operating noisemakers which produce noises louder than those of the ship. Since homing weapons are constructed to direct themselves towards the loudest source of noise, they may by-pass the real target for the noisemaker.

To accomplish this task of deception, the acoustic apparatus must mask the ship from hostile acoustic apparatus, and therefore must operate to produce sound over broad band of frequencies and at an intensity greater than that produced by the refuge—seeking ship. The production of noises having such sound intensities and broad frequency coverage presents serious design difficulties since the apparatus must operate independently of and at a remote point from the launching vessel and further, is restricted in size to escape enemy detection as well as to provide for convenience in launching. The latter is particularly of importance in submarines.

In accordance with the teachings of the present invention, a novel expendable acoustic apparatus is provided which is capable of operating independently of its launching vessel and is restricted in size to permit efficient ejection from a submarine. The apparatus is uniquely provided with a small but efficient noise generating means which is operative to create sounds of high intensity and over a broad band of frequencies, and a flotation system for maintaining the noise generating unit at a predetermined depth in the water and for a predetermined time period after which period the unit sinks to the bottom of the sea. Moreover, an adjustable timing device is provided to selectively adjust the time when the noise generating unit will commence its operation after ejection from a vessel. This time delay permits the fleeing vessel to avoid initial detection when an enemy vessel approaches it but has not as yet determined its exact location, and, further, permits the simultaneous ejection of a plurality of units in instances where only one unit is to operate at a time. Due to this time delay, the submarine is able to travel a relatively large distance from the acoustic apparatus before the apparatus begins its noise generating operation.

Accordingly, it is one object of the present invention to provide an expendable acoustic apparatus which is highly efficient for accomplishing its intended functions as a decoy.

Another object of the invention is the provision of an expandable acoustic apparatus which creates sound for a predetermined time period and the slowly sinks to the bottom of the sea.

A further object of the invention is to provide an expendable acoustic apparatus having an adjustable time delay of operation.

At still further object of the present invention is the provision of an improved adjustable timing unit.

Still another object is to provide an expendable acoustic apparatus which is constructed in a manner that it is idealy suited for launching from a submarine.

Other objects and many of the attendant advantages of this invention will be readily appreciated as the same becomes better understood by reference to the following detailed description when considered in connection with the accompanying drawings wherein.

Figure 1:
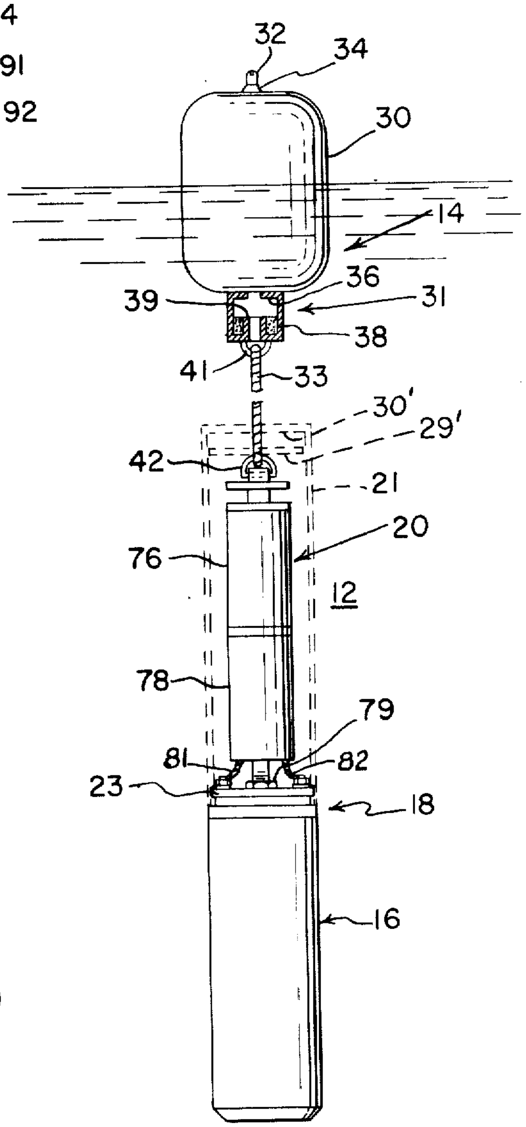
FIG. 1 is an elevation view showing, in full lines, a preferred embodiment of the acoustic apparatus in its released and operating position in the water and showing, in dotted lines, portions of the original container for the acoustic apparatus.

Referring now to the drawings wherein like reference characters designate like or corresponding parts throughout the several views, there is shown in FIG. 1 an acoustic apparatus 12 comprising the preferred embodiment of the instant invention. The acoustic apparatus which is shown in its released and operating position in the water preferably includes a flotation or buoyancy system 14 for providing a positive buoyancy for the unit, a noise generating unit or noisemaker 16 suspended from system 14, an adjustable timer 18, and a noisemaker power supply unit 20 for driving noise unit 16. As will hereinafter become apparent, when the acoustic apparatus is launched from a fleeing vessel, flotation system 14 is activated to provide a positive buoyancy for the apparatus. As such, the entire unit quickly rises in the water until system 14 reaches the surface. Once reaching the surface, the acoustic apparatus remains stationary, subject to slight movement by a turbulent sea.

At approximately the same time that flotation system 14 becomes activated, power supply 20 is activated to release the timer mechanism. Depending upon the preselected time interval, timer 18 energizes noisemaker 16 to generate the desired sound waves. The latter unit operates for only a relatively short period of time and then flotation system 14 ceases to function such that the entire apparatus slowly acquires a negative buoyancy and sinks to the bottom of the sea.

To facilitate launching of the acoustic apparatus and to protect the device while in storage and during ejection from a vessel, as for instance from a submerged submarine, the entire assembly is packed in a protective cylindrical container comprising an upper storage casing or housing compartment 21, a lower covering or container compartment 22, and a compartment separator 23. The latter member functions as a joining and supporting unit for the two compartments and their contents. The separator 23 also serves as a water tight closure for the top of the lower compartment 22. While the assembled container may be of any suitable or desired size, the container preferably is formed with an outer diameter of approximately three inches and a length of approximately 30 inches so that it may be conveniently ejected from the flare tube of a submarine if desired.

The upper compartment of the apparatus container is used solely as a housing for power supply 20 and deflated flotation or buoyancy system 14 during storage and launching of the apparatus. A buoyancy system and means for arranging it in collpased condition within a casing are disclosed and claimed in applications Ser. Nos. 292,593 and 324,860, filed 9 June 1952 and 8 Dec. 1952 respectively, by Leon E. Wedding, a co-inventor of the instant application. The compartment 21 is releasably secured to compartment separator 23 and generally comprises an elongated cylindrical member having its upper end closed. The lower open end of compartment 21 is provided with a thin integral flange 24 which snugly fits over a reduced portion 26 formed on the upper end of separator 23.

In order to releasably secure compartment 21 to separator 23 and to seal the interior of compartment 21 while in its secured position, a pair of vertically spaced annular grooves 27 and 28 are formed on on reduced portion 26 of separator 23. The comparator 21 is secured to separator 23 by a series of circumferentially spaced nipples punched in flange 24 in such a manner that the inwardly projecting portions of the nipples are received within groove 17. Due to the snug fit between flange 24 and reduced portion 26 and the construction of the projecting nipples, lateral relative movement is prevented between members. The joint between the separator 23 and the compartment 21 is sealed against moisture by crimping the extreme lower edge of flange 24 into firm engagement with a sealing means such as an O-ring 29 fitted within groove 28. Desirably, the inwardly projecting portions of the nipples and crimped flange 24 are made such that upper compartment 21 is securely fastened to separator 23 under conditions of ordinary handling but the members are adapted to be separated whenever an axial force is applied therebetween.

In normal practice, a delayed action explosive device (not shown) is inserted between a loosely-fitted disc 29′ (FIG. 1) and the top 30′ of compartment 21. This device, upon actuation, is adapted to produce an axial force of sufficient intensity to completely separate the two container sections and generally is made to detonate upon ejection of the apparatus from a subsurface vessel. A delay of approximately four seconds is ordinarily used before the explosure device is detonated so as to insure that the container is free of the vessel's ejecting mechanism before the container sections are separated. Once separated, compartment 21 and disc 29′ drop into the sea while flotation system 14 as well as power supply 20 are exposed to sea water.

The flotation system 14, which is adapted to give the acoustic apparatus a positive buoyancy when in its released or operative position in the water, is of the self-inflating type and preferably is of such size that when in its deflated condition the system fits snugly within compartment 21. This system, as best seen in FIG. 1, generally comprises an envelope or balloon 30, a gas generator 31 secured to the balloon, a gas escape valve 32, and a securing means which may be in the form of a cord 33 for attaching power supply 20 and noisemaker 16 to the flotation system.

Balloon 30 is constructed of a flexilbe inpervious material so that when it is inflated by a gaseous fluid it assumes a body configuration of such a size as to provide a positive buoyancy to the supported apparatus. In the illustrated embodiment, the balloon is made of a rubber covered fabric which, when inflated, assumes a cylindrical shape having the upper and lower edges thereof rounded. The gas to inflate balloon 30 is generated by a gas generator 31 having its upper end secured to a coupling 36 sealed in the lower side of balloon 30. Gas generator 31 may be of any suitable type that provides a substantially constant emission of gas over a period of time and preferably comprises a chemical containing cup 38 having a small aperture in its upper end for providing an entrance through coupling 36 into balloon 30. Centrally of cup 38 is an integral vent tube 39 that extends vertically from the cup base to a point well within the cup. The lower end of tube 39 is in open communication with the surrounding medium and serves to provide an access opening for water to enter cup 38.

The water activated chemical of generator 31 is carried in the lower portion of cup 38 between the outer walls of tube 38 and the inner walls of the cup. Although various chemicals may be employed for the production of gas, an excellent chemical for this purpose is lithium hydride since this chemical readily reacts with water to liberate liberal quantities of hydrogen gas.

Secured on the upper side of balloon 30, as by sealing or the like, is a coupling 34 which acts as an attaching means for escape valve 32. This valve, which may be an ordinary automobile tire valve cap, has a restricted orifice formed therein for permitting gas to escape from the balloon. The size of this orifice is initially fixed and is determined by the rate at which it is desired that the gas be permitted to continuously escape from balloon 30. This rate in turn determines the amount of gas which remains in balloon 30 and therefore the buoyancy of the system.

With this construction, whenever the apparatus is launched from a vessel and compartment 21 is forcefully removed from separator 23, gas generator 31 is exposed to water. As water enters cup 38 through vent tube 42, a chemical reaction occurs between the water and lithium hydride which produces as a product thereof hydrogen gas which rises through the water, the aperture at the top of cup 38, coupling 36, and into balloon 30. Because of the restricted opening in valve 32 and the quantity of gas generated, a pressure is quickly built up within the balloon to give the apparatus a positive buoyancy.

While an appreciable amount of gas will escape from valve 32, it will be appreciated that the amount of gas generated will be sufficient to compensate for this loss and maintain the balloon inflated. After a period of time depending upon the amount of chemical placed in cup 38, the chemical becomes expended and gas is no longer generated. This time period, while variable, preferably is of a short duration such as, for example, 20 minutes. When the chemical has been completely expended, the gas generating action ceases. The gas remaining in balloon 30 then leaks through valve 32 whereupon the acoustic apparatus assumes a negative buoyancy and the unit sinks to the bottom of the sea in a manner that the apparatus escapes capture or detection by an enemy.

Supported by flotation system 14 is the power supply 20 and noisemaker 16. These members are attached to flotation system 14 by a flexible line such as cord 33 which is attached at its ends to tie rings 41 and 42 secured to gas generator 31 and power supply 20, respectively. It will be obvious, of course, that cord 33 may be of any desired length so as to suspend the noisemaker at a convenient depth in the water where it will operate most effectively.

The noisemaker 16 serves to generate and radiate the sound energy into the water and comprises a motor driven, mechanical vibration generating unit. Noisemaker 16 includes lower compartment 22 which acts as a container for its various components and as a vibrating element, a rotatable spindle 51 having a plurality of rollers 52 adapted to engage the inner surface of compartment 22, and a driving means for spindle 51 including a motor 53 and power supply 20.

Lower compartment 22 is of hollow construction and generally comprises an elongated cylindrical member having its lower end closed by an integral bottom portion. The upper open end of the compartment, which is formed of relatively thick cylinder walls for reasons which will hereinafter become apparent, is internally threaded as at 73 and cooperates with a reduced threaded portion 74 on the lower end of separator 23 for securing the members together. Desirably, this threaded joint is made waterproof to protect the components contained in compartment 22 from water which may otherwise enter therein when the apparatus is exposed to the sea.

The noise creating members of noisemaker 16 are fitted in the innermost end of compartment 22 and include unitary spindle member 51. This spindle member is formed with a pair of axially aligned, parallel support discs 54 and 54, integrally joined at their axial centers by a vertically extended spacer 56. Each of the discs is annular in construction and has a diameter somewhat smaller than the inner diameter of compartment 22 for reasons which will hereinafter become apparent. Formed in the periphery of each disc and in diametrically opposed relation to each other, are a pair of recessed sockets 57 that extend radially inward, toward spacer 56, for a short distance. The arrangement of sockets 57 is such that the respective sockets of support disc 54 are in axially aligned relationship with the recessed sockets of support disc 54.

Slidably and rotatably mounted within each pair of aligned sockets 57 is a roller 52. Each roller is of unitary construction and includes a shaft 58 having a pair of integral hammers 59 formed adjacent its outer ends but positioned a sufficient distance from the shaft ends to provide a journal 61 for supporting the rollers at their ends within sockets 57. The hammers are preferably made cylindrical in shape with a plurality of longitudinal grooves on its periphery, however, any suitable shaped configuration such as a multiple sided member may be employed, the basic requirement being that it be capable of rotating relative to spindle 51 when the spindle rotates.

Whenever spindle 51 is rotated, rollers 52 are forced by centrifugal action against the inner surface of compartment 22 in such a manner that the irregular or grooved hammers 59 are rotated in sockets 57 relative to the internal compartment surface and the hammers continuously impinge or hammer against this surface to mechanically vibrate compartment 22. The effect of the vibrations set up in compartment 22 is to produce sound waves in the surrounding medium which cover a broad range of frequencies. This frequency range of noise output is variable and is dependent upon the rotative speed of rollers 52 relative to compartment 22 as well as the physical dimensions of the unit including the compartment wall thickness. Included in the rotative speed variable is the number of projections on each hammer and hence the number of impingements made by the hammers. Moreover, the acoustical output of noisemaker 16 is variable in that variation in the speed of rollers 52 varies the amount of centrifugal force acting on the rollers and thus the force behind each impingement of hammers 59 on compartment 22. It will be noted that while the generated noises are referred to as sound waves, the term sound, as used in this context, is defined as noise having a frequency range which may exceed the audible range but is within the frequency receiving range of hydrophone detection apparatus.

In this construction of mounting rollers 52 within recessed slots 57, substantially no load is applied to driving motor 53 upon initial movement of spindle 52 but rather, the load will increase gradually with an increase in speed since the rotational speed will determine the centrifugal force acting upon rollers 52 and therefore, the force by which rollers 52 will impinge against the compartment wall. Because motor 53 does not require a heavy starting torque, the noisemaker may be efficiently operated by a relatively small power source. While the power loss of the unit will vary with the motor speed and number of projections on hammers 59, for a high acoustic output with a minimum of power loss due to friction, the hammers preferably are provided with approximately 30 grooves on their periphery. It will be appreciated that with the unitary construction of spindle member 51, it is capable of withstanding heavy vibrational forces that are ordinarily applied thereto by rollers 52 when the spindle is rotated.

The spindle member 51, due to space and weight limitations of the expendable noisemaker, is driven by an electric motor 53 positioned intermediate the ends of compartment 22. The motor is directly coupled to the spindle member 51 by appropriate means such as a shaft 64 having a threaded portion screwed into a hole (not shown) formed in one end of spindle member 51. A lock nut 66 securely locks the elements together. A noisemaker of the type described is disclosed and claimed in application Ser. No. 339,498, filed 27 Feb. 1953 by Vivian L. Chrisler et al.

The motor is secured within compartment 22 to a spacer disc 67 by a nut and bolt arrangement which in turn is securely bolted to separator 23. Preferably, a plurality of vertically extending spacer members 71 are interposed between spacer disc 67 and separator 23 to define an open compartment 72 therebetween, which, as will hereinafter be explained, serves to accommodate timer mechanism 18.

The power for energizing motor 53 is obtained from a pair of sea batteries 76 and 78 (FIG. 1.) located in upper compartment 21 and attached to the upper end of separator 23 by a bolt 79 threaded into separated 23. Such sea batteries, as is well known to those skilled in the art, generally comprise a pair of spirally wound metal plates electrically separated by a chemically treated paper. One of the plates is usually formed of a sheet of pure silver coated with silver chloride while the other plate is formed of a sheet of magnesium. Batteries of this type are chemically inactive until immersed in sea water; when immersed, a chemical reaction takes place which produces a substantial amount of electrical power for a short period of time or until the materials are decomposed. As soon as the reaction is over, the batteries cease to generate power and are considered as having expended their useful life. In the embodiment shown, the batteries are so constructed as to be capable of providing an electrical current of approximately 20 amperes at a potential of eleven volts for a time period approximating five minutes.

Figure 2:
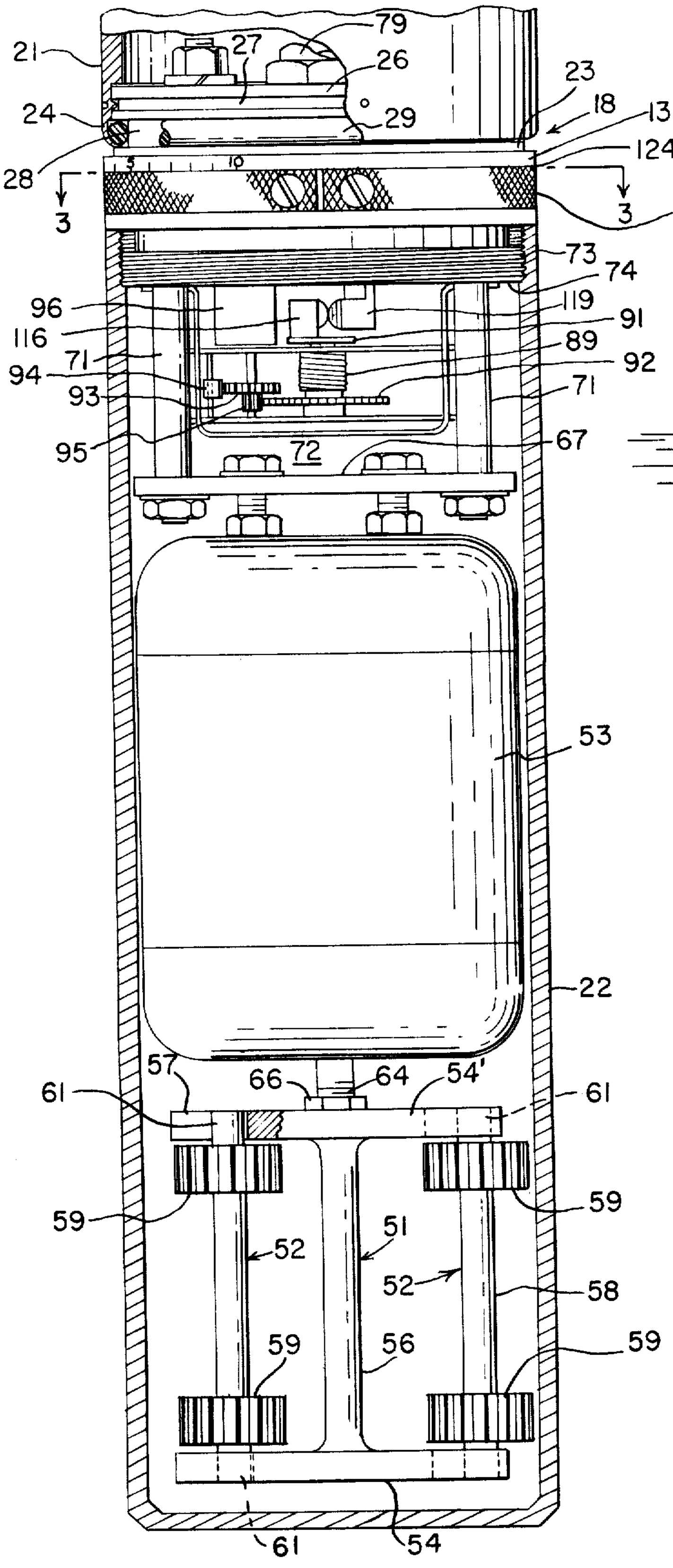
FIG. 2 is an elevation view, partly in section, showing the noise generating apparatus and the time mechanism of the apparatus of FIG. 1.
Figure 4:
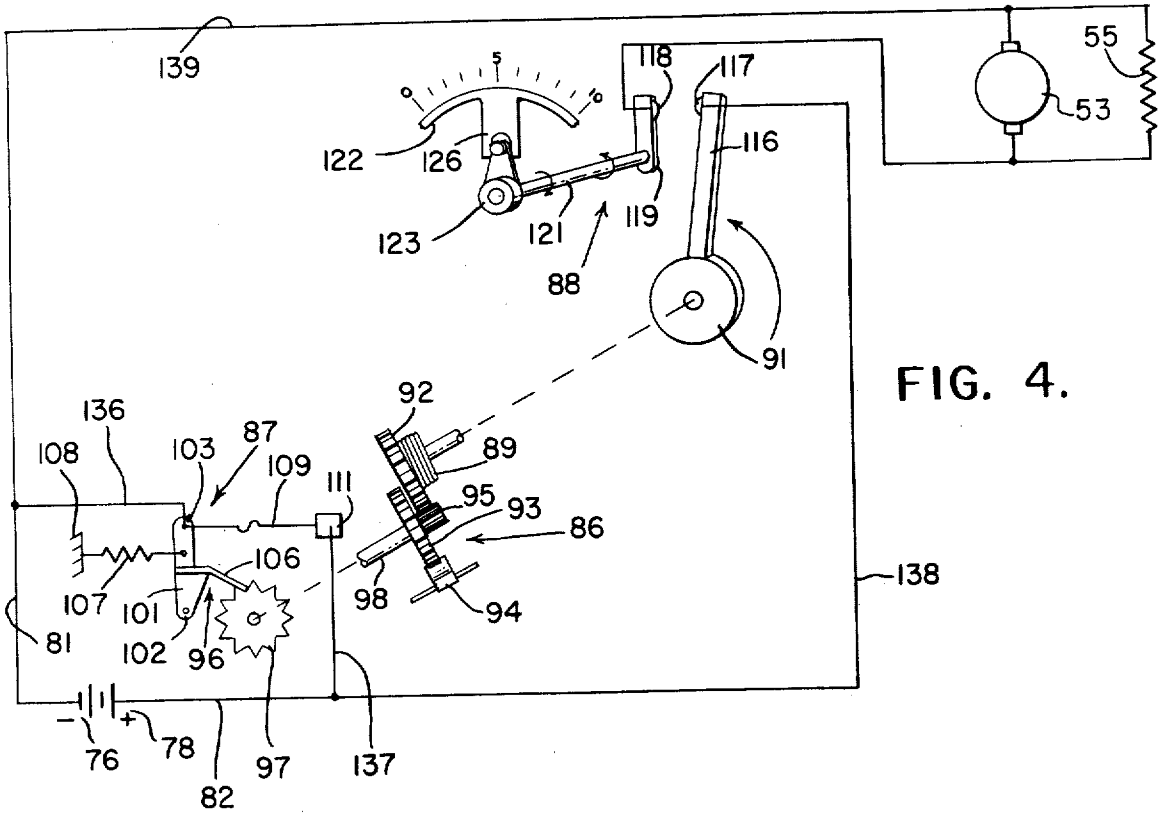
FIG. 4 is a composite view showing structural features and the electrical circuit of the timer unit.

In order to control the time-operations of the noisemaker after ejection from a vessel, an adjustable timer unit is incorporated into the decoy. This timer as best shown in FIGS. 2 and 4 comprises a suitably driven gear train and escapement mechanism 86, a latching mechanism 87 for tripping the escapement mechanism, and a circuit control means 88 which is connected in an electrical circuit with motor 53 and batteries 76 and 78. The escapement mechanism 86 may comprise any commercial clockwork timer but is shown as including a timer mechanism having a torque spring 89, drive gear 92, control gear 93, pinion gear 95, and an escapement pawl 94. The arrangement of this mechanism is substantially conventional and is such that spring 89 acts to rotate drive gear 92 for rotating a contact disc 91 connected thereto. This rotation is retarded from rapid rotation through reduction pinion gear 95 meshing with gear 92 and gear 93 which meshes with gear 95 and escapement pawl 94, respectively.

Initially, the clock train is prevented from rotating by a spring held latch 96 which engages the teeth of a ratchet gear 97 secured to gear 93 by a shaft 98. Latch 96 is preferably of unitary construction and includes a lowermost securing portion 101, an upper insulated terminal strip 103, and an extended arm 106 positioned intermediate members 101 and 103 in a manner that it protrudes outwardly therefrom to engage the teeth of ratchet gear 97. The lowermost securing position 101 is pivotally secured in position by a pin 102 mounted in a stationary member of noisemaker 16 while the upper terminal strip 103 is secured at its midsection to one end of a tension spring 107. The other end of spring 107 is attached to a stationary point 108 on noisemaker 16 so that spring 107 biases latch member 96 in a direction away from gear 97. To maintain latch 96 in engagement with gear 97, a fuse wire 109 is mechanically connected between strip 103 and an insulated terminal 111 permanently secured to separator 23.

The electrical control circuit 88 for timer 18 comprises a contact arm 116 fixedly secured on the periphery of disc 91. Secured on the upper end of arm 116 is insulated electrical contact 117 which is adapted to engage a second insulated electrical contact 118 secured to a second upstanding contact arm 119. The two arms are so arranged that when contact arm 119 is rotated towards arm 116, contacts 117 and 118 engage each other to close an electrical circuit. The second arm 119 is fixedly secured to a shaft 121 positioned in a plane normal to arm 119.

Figure 3:
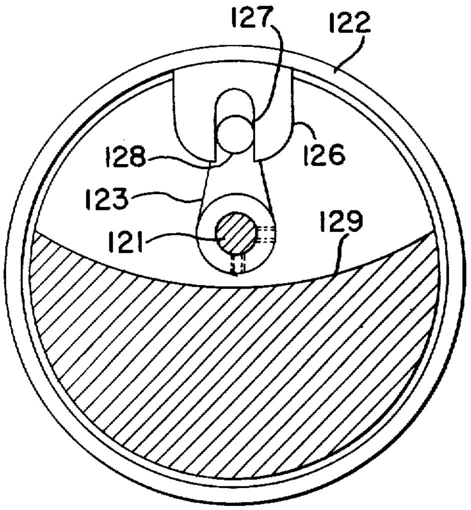
FIG. 3 is a cross-sectional view taken on the line 3—3 of FIG. 2 and showing portions of the timer apparatus.

As best shown in FIG. 3, shaft 121 extends through a bearing (not shown) in separator 23 and is mechanically connected to a setting link 123 of setting band 122. To accommodate the setting link, the separator is preferably cutaway as at 129 with the cutaway sector extending to a depth approximately one-half of the separator diameter. The setting band, which is connected to link 123, operates as a lever for setting timer 18 and is made in the form of a circular metallic band having its outer surfaces knurled. The band is slidably mounted in a groove 124 provided on the periphery of separator 23 and has an integral setting fork 126 extending radially inward from the band. Desirably, the lower end of fork 126 is formed with a bearing slot 127 to receive a bearing pin 128 secured to the upper portion of setting link 123.

Manual rotation of setting band 122 rotatably drives setting link 123 through fork 126 and pin 128 to rotate shaft 121. Desirably, sector 129 is of such size as to permit approximately 180° movement of setting link 123. This rotational movement is transmitted by shaft 121 to contact arm 119 through a side of compartment separator 23 which preferably is provided with a gland nut seal (not shown) having O-ring seals therein for preventing the entrance of water into the noisemaker through opening 129 and around shaft bearings.

An indicia plate 131 is placed on the exterior walls of separator 23, adjacent setting band 122, with graduations printed thereon reading from zero to ten minutes for convenience in setting the operation time of the apparatus.

The electrical circuit of the acoustic apparatus is shown in FIG. 4. This circuit includes fuse wire 109 for holding latch 96 in engagement with gear 97 and a pair of leads 136 and 137 connected to the opposite ends of fuse wire 109 at strip 103 and terminal 112, respectively. Each of the leads 136 and 137 is connected through terminal wires 81 and 82 to the opposite terminals of series connected batteries 76 and 78. The circuit of motor 53 is connected in parallel with the fuse circuit and includes line 138 connected between the positive terminal of battery 78 and rotatable contact 117, settable contact 118, motor 53, lead line 139, and lead line 81 which terminates at the negative terminal of the power supply. Desirably, the motor includes a shunt field winding 55 connected in parallel with its armature.

OPERATION

The acoustic apparatus is prepared for operation by rotating setting band 122 an amount equal to a period of time, as indicated by indicia 131, that it is desired the noisemaker remain inoperative after launching from a vessel. It will be apparent that this rotation of band 122 varies the separation between contacts 117 and 118 by rotating contact arm 119 through link 123 and shaft 121, and, therefore, varies the time required for clockwork 86 to move contact 117 into engagement with contact 118. After this setting operation, the acoustic apparatus is launched from a vessel in any suitable manner. Depending upon the set delay, the explosive device positioned in compartment 21 is actuated to force upper compartment 21 away from compartment separator 18 so as to expose gas generator 31 and sea batteries 76, 78 to the water.

As water enters the gas generator, hydrogen gas is generated by a resulting chemical action between the water and lithium hydride and quickly inflates balloon 30 so as to give the apparatus a positive buoyancy. The balloon therefore rises to the water surface and suspends the noisemaker at a depth fixed by the length of cord 33. In the meantime, as water enters batteries 76 and 78, the batteries began to generator an electric current which flows through the latch circuit. This current melts fuse wire 109 and releases spring 107 whereby the spring forces latch 96 out of engagement with gear 97 and permits clockwork 86 to operate and slowly turn disc 91 counterclockwise. After the preset time interval, contact 117 is moved into engagement with contact 118 to complete the circuit to motor 53.

Energization of motor 53 starts a motor rotation which revolves spindle 51. As the spindle revolves, the resultant centrifugal force acts upon rollers 52 to force hammers 59 to revolve and impinge against the internal surface of compartment 22 whereupon the compartment is vibrated to produce a noise of high intensity and over a broad band of frequencies.

Obviously many modifications and variations of the present invention are possible in the light of the above teachings without departing from the spirit and the scope of the invention as set forth in the appended claims as only a preferred embodiment thereof has been disclosed.

What is claimed is:

1. In an expendable acoustic apparatus adapted to operate underwater as a decoy and having an electrically driven noisemaker operative to generate sound waves of large amplitude over a broad band of frequencies, said noisemaker comprising a driving electrical drive means, a sea battery, energizing means for said drive means connecting said drive means and said battery, said energizing means including a time delay means for delayed energization of said drive means, said time delay means comprising a manually adjustable contact arm having an electrical contact thereon, a second contact arm having a second electrical contact, a driven gear train connected to said second contact arm and operative to rotate said second contact into engagement with said first contact, a latching means releasably holding said gear train from operation, said latching means including a latch biased out of engagement with said gear train and a fuse wire, said fuse wire being secured to said latch to maintain said latch in engagement with said gear train in a manner such that melting of the fuse wire disengages the latch to release the gear train for closing said contacts, and connections from said sea battery to said fuse wire.

2. A self-contained, expendable acoustic apparatus adapted to be launched from a vessel and operative to act as a decoy comprising, a first container having a noisemaker and a timer contained therein, a casing releasably secured to said first container a water activated power supply and a buoyancy system covered by said casing, means releasably securing said container and casing such that upon separation said power supply is exposed to sea water, said buoyancy system including an inflatable container and means in communication with the inflatable container for generating a gas upon contact with water such that the generated gas inflates the inflatable container to give a positive buoyancy to the apparatus, means for securing said noisemaker in suspended relation to said buoyancy system, said timer including a circuit breaker, a circuit connecting said power supply and said circuit breaker electrically, said circuit including a branch whereby the timer is actuated upon immersion of the power supply in water to control the time of operation of the noisemaker.

3. An expendable underwater acoustic apparatus adapted to generate sound waves over a broad band of frequencies, comprising a lower casing adapted to be held in upright position, a separator closing the upper end of said casing, an upper storage and protective housing, said separator having means thereon for removably receiving said upper housing, with said separator and said housing cooperating to provide a closed storage space in said housing, a buoyancy system in the upper part of said housing, a sea battery in the lower part of said housing, said sea battery being carried by said separator, said lower casing having therein: a rotatable noisemaker, an electric motor for driving said noisemaker, a switch means including a timing means for controlling operation of said switch means, a motor energizing circuit including said switch means, sea battery and motor, and means operated by said battery upon exposure to sea water to initiate operation of said timer means to close said switch means, after a predetermined period for delaying energization of said motor by said sea battery.

4. Apparatus as defined in claim 10 but further characterized by means including an indicator on the outside of said lower casing for adjusting the time required by said timing means to operate said switch means.

5. A self-contained, expendable acoustic apparatus adapted for underwater operation to generate sound waves over a broad band of frequencies comprising, an electrically powered noisemaker including a container having an external surface adapted to be in contact with the water, a unitary spindle supported within said container at one end thereof, a plurality of rollers slidably and rotatably carried by said spindle and operative to impinge against the interior surface of the container, an electric motor supported centrally in said container having a shaft having an end connected to said spindle for rotatably driving said spindle, an energizing circuit means for said motor at the other end of said container, said circuit means comprising a sea battery and switch means operative when actuated to energize said motor through said circuit means and sea battery, time control means for delayed actuation of said switch means for delayed energization of said motor by said sea battery, said time control means comprising a powered gear train mechanically connected to said switch means for operating said switch means, a latch means including a fuse releasably restraining said train in an unactuated position, a connection directly connecting said fuse across said sea battery, and a buoyancy means secured to the noisemaker.

6. An expendable underwater acoustic apparatus comprising an elongated lower container and an elongated upper casing arranged in line, means releasably holding said container and casing including a separator secured to the top of said lower container between said container and said casing, means cooperating with said separator and said casing to provide a watertight storage space, a sea battery carried by said separator inside said storage space, an electric motor carried inside said container intermediate its ends, circuit connections from said battery to said motor, including time-delay switch means in said container at the upper end thereof for, delaying energization of said motor by said sea battery for a predetermined period and a noisemaker in said container at the lower end thereof, said noisemaker connected to and driven by said motor.

7. An expendable underwater acoustic apparatus comprising an elongated lower container and an elongated upper housing arranged in line, means including a separator releasably holdng said container and housing in watertight arrangement, said separator being secured to an end of said lower container, a sea battery carried by said separator inside said housing, an electric motor carried centrally inside said container, circuit connections from said battery to said motor, including time-delay switch means in said container at the upper end thereof operable a predetermined time after actuation, noisemaking means in said container at the lower end thereof, said noisemaking means being connected to and driven by said motor, said time-delay switch means including an adjustable member adjustable to different positions and controlling the time period of operation of said switch means after actuation for delaying energization of said motor by said sea battery for a predetermined period, and an indicator means on the outside of said apparatus for indicating the adjusted position of said adjustable member.

* * * * *